United States Patent
Kurian

(10) Patent No.: US 10,796,253 B2
(45) Date of Patent: Oct. 6, 2020

(54) SYSTEM FOR RESOURCE USE ALLOCATION AND DISTRIBUTION

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1108 days.

(21) Appl. No.: 15/185,526

(22) Filed: Jun. 17, 2016

(65) Prior Publication Data

US 2017/0364842 A1  Dec. 21, 2017

(51) Int. Cl.
  *G06Q 10/06* (2012.01)
  *G06Q 50/26* (2012.01)
  *G06Q 20/28* (2012.01)
  *G06Q 30/06* (2012.01)

(52) U.S. Cl.
  CPC ......... *G06Q 10/0631* (2013.01); *G06Q 50/26* (2013.01); *G06Q 20/28* (2013.01); *G06Q 30/06* (2013.01); *G06Q 30/0645* (2013.01)

(58) Field of Classification Search
  CPC .... G06Q 10/0631; G06Q 50/26; G06Q 20/28; G06Q 30/06; G06Q 30/0645
  USPC ....................................................... 705/7.12
  See application file for complete search history.

(56) References Cited

U.S. PATENT DOCUMENTS

| | | |
|---|---|---|
| 5,717,923 A | 2/1998 | Dedrick |
| 5,761,648 A | 6/1998 | Golden et al. |
| 5,842,185 A | 11/1998 | Chancey et al. |
| 5,848,396 A | 12/1998 | Gerace |
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |

(Continued)

FOREIGN PATENT DOCUMENTS

CN 104283967 A 1/2015

OTHER PUBLICATIONS

Nicoletti, Tony. GPS Advantage. Rental Equipment Register 49.13: NA. Penton Media, Inc., Penton Business Media, Inc. and their subsidiaries. (Dec. 1, 2006).*

(Continued)

*Primary Examiner* — Timothy Padot
(74) *Attorney, Agent, or Firm* — Michael A. Springs; Moore & Van Allen PLLC; Nicholas C. Russell

(57) ABSTRACT

Embodiments of the invention are directed to a system, method, or computer program product for appropriate resource allocation via generated communication channel within and for the utilization of a shared use service. The system may be associated with or affixed to a shared use service object, generating a communication field within or directly around the shared use service object. The system may recognize when an individual is utilizing the shared use service via signal recognition of a mobile device transmission being received by the system associated with the shared use service. The system may identify an end destination of the user using the shared use service and calculate a resource requirement based on the same. The resource requirement may be presented to the user via the mobile device through the generated communication linkage.

20 Claims, 6 Drawing Sheets

(56) References Cited

U.S. PATENT DOCUMENTS

| | | |
|---|---|---|
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,327,578 B1 | 12/2001 | Linehan |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,829,232 B1 | 12/2004 | Takeda et al. |
| 6,853,291 B1 | 2/2005 | Aisa |
| 6,865,545 B1 | 3/2005 | Epstein et al. |
| 6,906,617 B1 | 6/2005 | Van der Meulen |
| 6,925,444 B1 | 8/2005 | McCollom et al. |
| 6,937,995 B1 | 8/2005 | Kepecs |
| 6,980,973 B1 | 12/2005 | Karpenko |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 | 8/2008 | Doyle |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B2 | 12/2010 | Magruder et al. |
| 7,925,579 B1 | 4/2011 | Flaxman et al. |
| 8,042,178 B1 | 10/2011 | Fisher et al. |
| 8,234,194 B2 | 7/2012 | Mele et al. |
| 8,294,747 B1 | 10/2012 | Weinberg et al. |
| 8,301,558 B2 | 10/2012 | Marshall et al. |
| 8,316,237 B1 | 11/2012 | Felsher et al. |
| 8,442,894 B2 | 5/2013 | Blackhurst et al. |
| 8,495,072 B1 | 7/2013 | Kapoor et al. |
| 8,560,106 B2 | 10/2013 | Swyers et al. |
| 8,682,804 B1* | 3/2014 | Yoon .................. G06Q 30/0645 705/307 |
| 8,930,265 B2 | 1/2015 | Blackhurst et al. |
| 8,984,113 B2 | 3/2015 | Li et al. |
| 9,009,828 B1 | 4/2015 | Ramsey et al. |
| 9,032,077 B1 | 5/2015 | Klein et al. |
| 9,043,879 B1 | 5/2015 | Reeves et al. |
| 9,104,189 B2 | 8/2015 | Berges Gonzalez et al. |
| 9,106,615 B2 | 8/2015 | Grossman |
| 9,338,181 B1 | 5/2016 | Burns et al. |
| 9,361,637 B2 | 6/2016 | Coon et al. |
| 9,411,982 B1 | 8/2016 | Dippenaar et al. |
| 9,655,197 B1 | 5/2017 | Coombes et al. |
| 9,693,296 B2 | 6/2017 | Wan et al. |
| 9,721,441 B2 | 8/2017 | Lee et al. |
| 9,743,272 B1 | 8/2017 | Ogrinz et al. |
| 9,775,131 B2 | 9/2017 | Winand et al. |
| 9,843,624 B1 | 12/2017 | Taaghol et al. |
| 9,866,697 B2 | 1/2018 | Stepanian |
| 9,874,923 B1 | 1/2018 | Brown et al. |
| 9,946,571 B1 | 4/2018 | Brown et al. |
| 9,995,501 B2 | 6/2018 | Quam et al. |
| 10,013,677 B2 | 7/2018 | Jones et al. |
| 10,210,498 B1 | 2/2019 | Meyyappan et al. |
| 2002/0032626 A1 | 3/2002 | DeWolf et al. |
| 2002/0049624 A1 | 4/2002 | Raveis, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0095269 A1 | 7/2002 | Natalini et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2003/0115367 A1 | 6/2003 | Ohara |
| 2003/0217160 A1* | 11/2003 | Gayama .................. G06F 16/40 709/228 |
| 2004/0010462 A1 | 1/2004 | Moon et al. |
| 2004/0122736 A1 | 6/2004 | Strock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0237114 A1 | 11/2004 | Drazin |
| 2004/0249768 A1 | 12/2004 | Kontio et al. |
| 2005/0015624 A1 | 1/2005 | Ginter et al. |
| 2005/0018686 A1 | 1/2005 | Igarashi et al. |
| 2005/0039053 A1 | 2/2005 | Walla |
| 2005/0075975 A1 | 4/2005 | Rosner et al. |
| 2005/0128969 A1 | 6/2005 | Lee et al. |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1 | 6/2007 | Gaedeken et al. |
| 2007/0136418 A1 | 6/2007 | Wolfe |
| 2007/0147320 A1 | 6/2007 | Sattari et al. |
| 2007/0233899 A1 | 10/2007 | Aborn |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0008117 A1 | 1/2008 | Alizadeh-Shabdiz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser, II et al. |
| 2008/0133336 A1 | 6/2008 | Altman et al. |
| 2008/0162224 A1 | 7/2008 | Coon et al. |
| 2008/0162316 A1 | 7/2008 | Rampell et al. |

(56) References Cited

U.S. PATENT DOCUMENTS

| | | |
|---|---|---|
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0289009 A1 | 11/2008 | Lee et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |
| 2009/0122797 A1 | 5/2009 | Thubert et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0316701 A1 | 12/2009 | Yoo et al. |
| 2009/0319638 A1 | 12/2009 | Faith et al. |
| 2010/0070525 A1 | 3/2010 | Clark et al. |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2010/0332251 A1 | 12/2010 | Yanak et al. |
| 2011/0040785 A1 | 2/2011 | Steenberg et al. |
| 2011/0047597 A1 | 2/2011 | Mahaffey et al. |
| 2011/0087547 A1 | 4/2011 | Amaro et al. |
| 2011/0103392 A1 | 5/2011 | Fan et al. |
| 2011/0116442 A1 | 5/2011 | Caldwell et al. |
| 2011/0182280 A1 | 7/2011 | Charbit et al. |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0246404 A1* | 10/2011 | Lehmann ............ G06Q 50/14 706/21 |
| 2011/0270773 A1 | 11/2011 | Siekman et al. |
| 2011/0302201 A1 | 12/2011 | Ogaz et al. |
| 2012/0016803 A1 | 1/2012 | Tharp |
| 2012/0028635 A1 | 2/2012 | Borg et al. |
| 2012/0030092 A1 | 2/2012 | Marshall et al. |
| 2012/0078996 A1 | 3/2012 | Shah |
| 2012/0190386 A1 | 7/2012 | Anderson |
| 2012/0190455 A1 | 7/2012 | Briggs |
| 2012/0226605 A1 | 9/2012 | Veerubhotla |
| 2012/0290230 A1 | 11/2012 | Berges Gonzalez et al. |
| 2013/0006813 A1 | 1/2013 | Carlin et al. |
| 2013/0046626 A1 | 2/2013 | Grigg et al. |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1 | 5/2013 | Raleigh et al. |
| 2013/0185558 A1 | 7/2013 | Seibert et al. |
| 2013/0223340 A1 | 8/2013 | Jeong |
| 2013/0260682 A1 | 10/2013 | Suzuki et al. |
| 2013/0298242 A1 | 11/2013 | Kumar et al. |
| 2013/0307702 A1 | 11/2013 | Pal et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0114866 A1* | 4/2014 | Abhyanker ............ G06Q 10/10 705/307 |
| 2014/0115324 A1 | 4/2014 | Buer |
| 2014/0136623 A1 | 5/2014 | Kvache et al. |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1 | 1/2015 | Lee et al. |
| 2015/0043516 A1 | 2/2015 | Liu et al. |
| 2015/0081837 A1 | 3/2015 | Bernier et al. |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0095478 A1 | 4/2015 | Zuerner |
| 2015/0105880 A1 | 4/2015 | Slupik et al. |
| 2015/0227406 A1 | 8/2015 | Jan et al. |
| 2015/0293574 A1 | 10/2015 | Ehsan et al. |
| 2015/0294286 A1* | 10/2015 | Grote .................. G06Q 20/145 705/13 |
| 2015/0294553 A1 | 10/2015 | Logan et al. |
| 2015/0312348 A1 | 10/2015 | Lustgarten |
| 2015/0327071 A1 | 11/2015 | Sharma et al. |
| 2015/0358317 A1 | 12/2015 | Deutschmann et al. |
| 2015/0363867 A1 | 12/2015 | Tipton et al. |
| 2015/0366411 A1 | 12/2015 | Yang et al. |
| 2016/0005043 A1 | 1/2016 | Goldstone et al. |
| 2016/0057051 A1 | 2/2016 | McAndrew et al. |
| 2016/0065628 A1 | 3/2016 | Guo et al. |
| 2016/0071334 A1 | 3/2016 | Johnson et al. |
| 2016/0087933 A1 | 3/2016 | Johnson et al. |
| 2016/0092847 A1 | 3/2016 | Buchbinder |
| 2016/0132832 A1 | 5/2016 | Pinkovezky et al. |
| 2016/0163130 A1 | 6/2016 | Zagajac et al. |
| 2016/0164919 A1 | 6/2016 | Satish et al. |
| 2016/0205599 A1 | 7/2016 | Zhang et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0247057 A1* | 8/2016 | Lee ...................... G06K 7/0004 |
| 2016/0269411 A1 | 9/2016 | Malachi |
| 2016/0295410 A1 | 10/2016 | Gupta et al. |
| 2016/0300201 A1 | 10/2016 | Li et al. |
| 2016/0328282 A1 | 11/2016 | Rogati et al. |
| 2016/0337869 A1 | 11/2016 | Dai et al. |
| 2016/0342982 A1 | 11/2016 | Thomas et al. |
| 2016/0364823 A1* | 12/2016 | Cao ...................... G06Q 50/30 |
| 2016/0367415 A1 | 12/2016 | Hayes et al. |
| 2017/0004508 A1 | 1/2017 | Mansfield et al. |
| 2017/0006135 A1 | 1/2017 | Siebel et al. |
| 2017/0017354 A1 | 1/2017 | Wei |
| 2017/0041296 A1 | 2/2017 | Ford et al. |
| 2017/0061442 A1 | 3/2017 | Barlow et al. |
| 2017/0076408 A1 | 3/2017 | D'Souza et al. |
| 2017/0122615 A1 | 5/2017 | Tang |
| 2017/0124642 A1 | 5/2017 | Barnett et al. |
| 2017/0171513 A1 | 6/2017 | Nakamura |
| 2017/0178186 A1 | 6/2017 | Craft |
| 2017/0208079 A1 | 7/2017 | Cammarota et al. |
| 2017/0208139 A1 | 7/2017 | Li et al. |
| 2017/0213451 A1 | 7/2017 | Potucek et al. |
| 2017/0228773 A1 | 8/2017 | Takayama |
| 2017/0235454 A1 | 8/2017 | Selfridge et al. |
| 2017/0244618 A1 | 8/2017 | DeLuca et al. |
| 2017/0256157 A1 | 9/2017 | Johan et al. |
| 2017/0278133 A1 | 9/2017 | Corrado et al. |
| 2017/0280459 A1 | 9/2017 | Ogrinz |
| 2017/0302669 A1 | 10/2017 | Chen et al. |
| 2017/0323345 A1 | 11/2017 | Flowers et al. |
| 2017/0332228 A1 | 11/2017 | Oda |
| 2017/0352071 A1 | 12/2017 | Carey et al. |
| 2017/0353859 A1 | 12/2017 | Idnani et al. |
| 2017/0366422 A1 | 12/2017 | Castinado et al. |
| 2017/0374583 A1 | 12/2017 | Ogrinz et al. |

(56) References Cited

U.S. PATENT DOCUMENTS

| | | |
|---|---|---|
| 2018/0007131 A1 | 1/2018 | Cohn et al. |
| 2018/0295517 A1 | 10/2018 | Bicket et al. |
| 2019/0179300 A1 | 6/2019 | Cella et al. |

OTHER PUBLICATIONS

-Qiu, Xuan et al. Physical assets and service sharing for IoT-enabled Supply Hub in Industrial Park (SHIP). International Journal of Production Economics 159 : 4-15. Elsevier B.V. (Jan. 1, 2015).*
Car sharing's new look. Lee, Ellen. San Francisco Chronicle Jun. 20, 2011: D1.*
Friedman, Jack P., Dictionary of Business Terms, 2000, Barron's Educational Series, Inc., 3rd edition, 225.
Guagliardo, Joseph C. et al., "Blockchain: Preparing for Disruption Like Its the 90s"; Mar. 14, 2016, retrieved fr; Mar. 14, 2016, retrieved from http://www.law360.com/articles/77120CVprint?section=ip.
Guagliardo, Joseph C. et al., "Blockchain: Preparing for Disruption Like Its the 90s"; Mar. 14, 2016, retrieved from http://www.law360.com/articles/77120CVprint?section=ip.
International Preliminary Report on Patentability (IPRP) dated Jul. 31, 2012 for International Application No. PCT/US2011/022765.
International Search Report and the Written Opinion of the International Searching Authority dated Mar. 25, 2011 for International Application No. PCT/US11/22781.
International Search Report and the Written Opinion of the International Searching Authority dated Mar. 25, 2011 for International Application No. PCT/US11/22783.
International Search Report and the Written Opinion of the International Searching Authority dated Mar. 28, 2011 for International Application No. PCT/US11/22771.
International Search Report and the Written Opinion of the International Searching Authority dated Mar. 29, 2011 for International Application No. PCT/US11/22779.
International Search Report and the Written Opinion of the International Searching Authority dated Mar. 29, 2011 for International Application No. PCT/US11/22785.
International Search Report and the Written Opinion of the International Searching Authority dated Apr. 8, 2011 for International Application No. PCT/US11/22765.
"SecKit: A Model-based Security Toolkit for the Internet of Things", by Neisse et al. European Commission Joint Research Centre, Ispra, Italy. Published Jun. 23, 2015. ScienceDirect, Computers & Security 54 (2015). pp. 60-76. (Year: 2015).
Definition of "consumable", Cobuild Advanced English Dictionary. Copyright @ HarperCollins Publishers (Year: 2013).

* cited by examiner

```
                                    500

┌─────────────────────────────────────────────────────┐
  │ IDENTIFY USER DEVICE WITHIN SMART DEVICE PARAMETER OF│
  │              SHARED USE SERVICE                      │
  │                     502                              │
  │   ┌──────────┐              ┌──────────────┐        │
  │   │   USER   │              │SHARED ACCOUNT│        │
  │   │   503    │              │   HOLDER     │        │
  │   └──────────┘              │    505       │        │
  │                             └──────────────┘        │
  └─────────────────────────────────────────────────────┘
                          │
                          ▼
  ┌─────────────────────────────────────────────────────┐
  │  COMMUNICATE WITH USER DEVICE TO DETERMINE END      │
  │              DESTINATION OF USER                     │
  │                     504                              │
  │  ┌─────────┐    ┌─────────┐    ┌─────────┐         │
  │  │USER INPUT│    │HISTORIC │    │  DATA   │         │
  │  │   506    │    │ TRENDS  │    │RETRIEVAL│         │
  │  │          │    │   508   │    │   510   │         │
  │  └─────────┘    └─────────┘    └─────────┘         │
  └─────────────────────────────────────────────────────┘
                          │
                          ▼
  ┌─────────────────────────────────────────────────────┐
  │  IDENTIFY POTENTIAL TRANSFERS FROM ONE SHARED USE   │
  │              SERVICE TO ANOTHER                      │
  │                     512                              │
  └─────────────────────────────────────────────────────┘
                          │
                          ▼
  ┌─────────────────────────────────────────────────────┐
  │ COMMUNICATE REQUIRED RESOURCES FOR USE OF SHARED    │
  │           USE SERVICE TO USER DEVICE                 │
  │                     514                              │
  └─────────────────────────────────────────────────────┘
                          │
                          ▼
  ┌─────────────────────────────────────────────────────┐
  │   RECEIVE RESOURCES FOR USE FROM SHARED ACCOUNT     │
  │                     516                              │
  └─────────────────────────────────────────────────────┘
                          │
                          ▼
  ┌─────────────────────────────────────────────────────┐
  │ TRIGGER REPRESENTATIVE ACTION UPON IDENTIFICATION OF│
  │                 DESTINATION                          │
  │                     518                              │
  └─────────────────────────────────────────────────────┘
```

Figure 5

SYSTEM FOR RESOURCE USE ALLOCATION AND DISTRIBUTION

BACKGROUND

Objects such as devices, vehicles, buildings, machines, or the like are becoming interconnected via network channels thereby forming a network framework of physical objects. In this way, these objects can be configured to be sensed and controlled remotely across existing network infrastructure. As such, creating opportunities for more direct integration of network identifications into the shared use services.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for resource use allocation and distribution within a shared use service. The expansion of smart devices to encompass systems and devices in home, industrial, and other business contexts raise technical challenges and areas for technical advancement that the invention system is capable of addressing. The invention provides a resource use allocation and distribution system utilized by a shared use service. In this way, a shared use service, such as a service used by multiple users at one time, including public transportation or the like, may be associated with a smart device system. The smart device system may recognize when a user enters the shared use service location and a geographic location associated with the entering of the service location. The recognition may be performed via signal recognition of the user device transmission being received and/or communicated to the smart device system associated with the shared use service.

In some embodiments, once the smart device recognizes the user device, the smart device may reach out to the user device to identify an end destination of the user. The end destination may be determined by the system based on user input, based on data extracted from the user device such as historic information, or trends in previous uses of the shared use service. Once the end destination of the user is identified, the system may calculate the resources required by the shared use service for reaching that end destination. The resource requirement will be displayed to the user for acceptance of the resource usage. In this way, the system may eliminate expired tickets, transfer expenses, and misappropriation, by providing a resource allocation and distribution service for shared use services based on recognition of a user, via a user device, within a smart device field associated with the shared use service.

In some embodiments, the system may generate a cost sharing system. In this way, the smart device associated with the shared use service may communicate with user devices to distribute cost among several users of the shared use service. For example, a bus may identify the riders and interacts with their user devices to request resources from the riders for the bus fare. Alternatively, a metro bus/train service is able to track riders that have paid for the service and request resources from those that haven't. Furthermore, a shared account on multiple devices on cars or user devices may be utilized for a household to request resources from resource accounts. The account can deny certain toll roads.

Embodiments of the invention relate to systems, methods, and computer program products for resource use allocation for a shared use service, the invention comprising: linking a smart device systems to an object of a shared use service, wherein the object is a machine or product; generating a communication area within the object of the shared use service; identifying one or more user devices within the communication area; determining end destination of user associated with user device within the communication area; identifying one or more transfers to a second object of the shared use service for the user to reach the end destination; communicating, via a secure communication linkage established in the communication area, an interface with a resource requirement for the end destination; receiving resource requirement from the user; and transmitting, to a representative operating the object, the user end destination for the shared use service for termination of the service at the end destination.

In some embodiments, the invention further comprises scanning for user devices on the object while the shared use service is being performed to determine non-compliant users using the shared use service, wherein upon determination of non-compliance, request resources from the user device.

In some embodiments, generating a communication area within the object of the shared use service further comprises generating a communication recognition area within and within a predetermined distance around the object, wherein the communication area recognizes a presence of one or more signal transmitting devices within the communication area.

In some embodiments, determining the end destination of user associated with user device within the communication area further comprises pushing via a communication linkage with the communication area, an interface to the user at the user device for user selection of an end destination.

In some embodiments, determining the end destination of user associated with user device within the communication area further comprises reviewing historic user use of the shared use service for trends and predicting the end destination of the user based on the trends In some embodiments, identifying the one or more user devices that are associated with the user within the communication area further comprises identifying a geographic location of the object using GPS associated with the smart device system and identifying transmitting signals associated with the one or more user devices from within the geographic location.

In some embodiments, the object with the smart device system associated therewith further comprise a products, machinery, or vehicle using the smart device systems for transmitting signals associated with the product or machinery capable of identifying user devices within the signal transmission.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
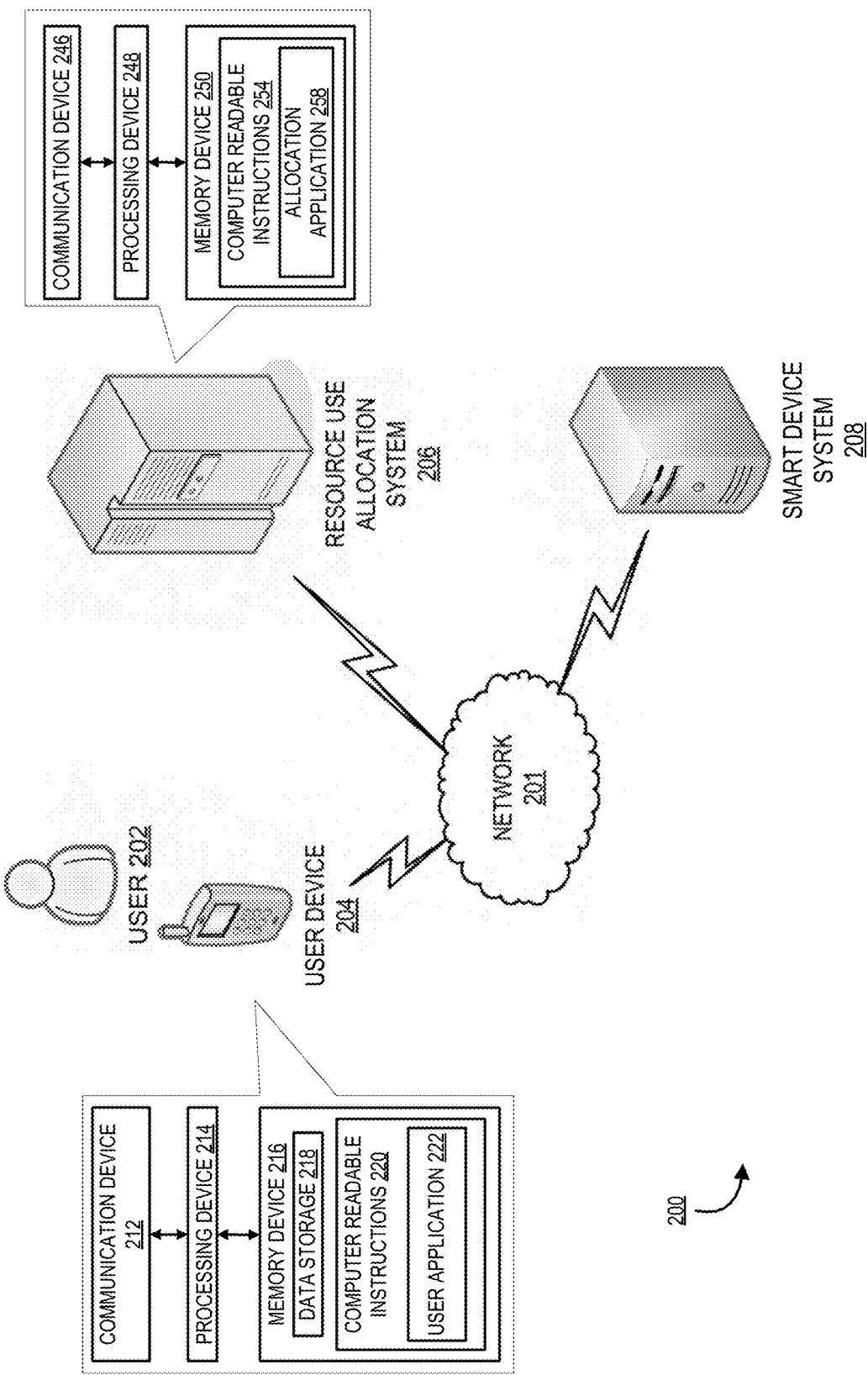
Figure 2:
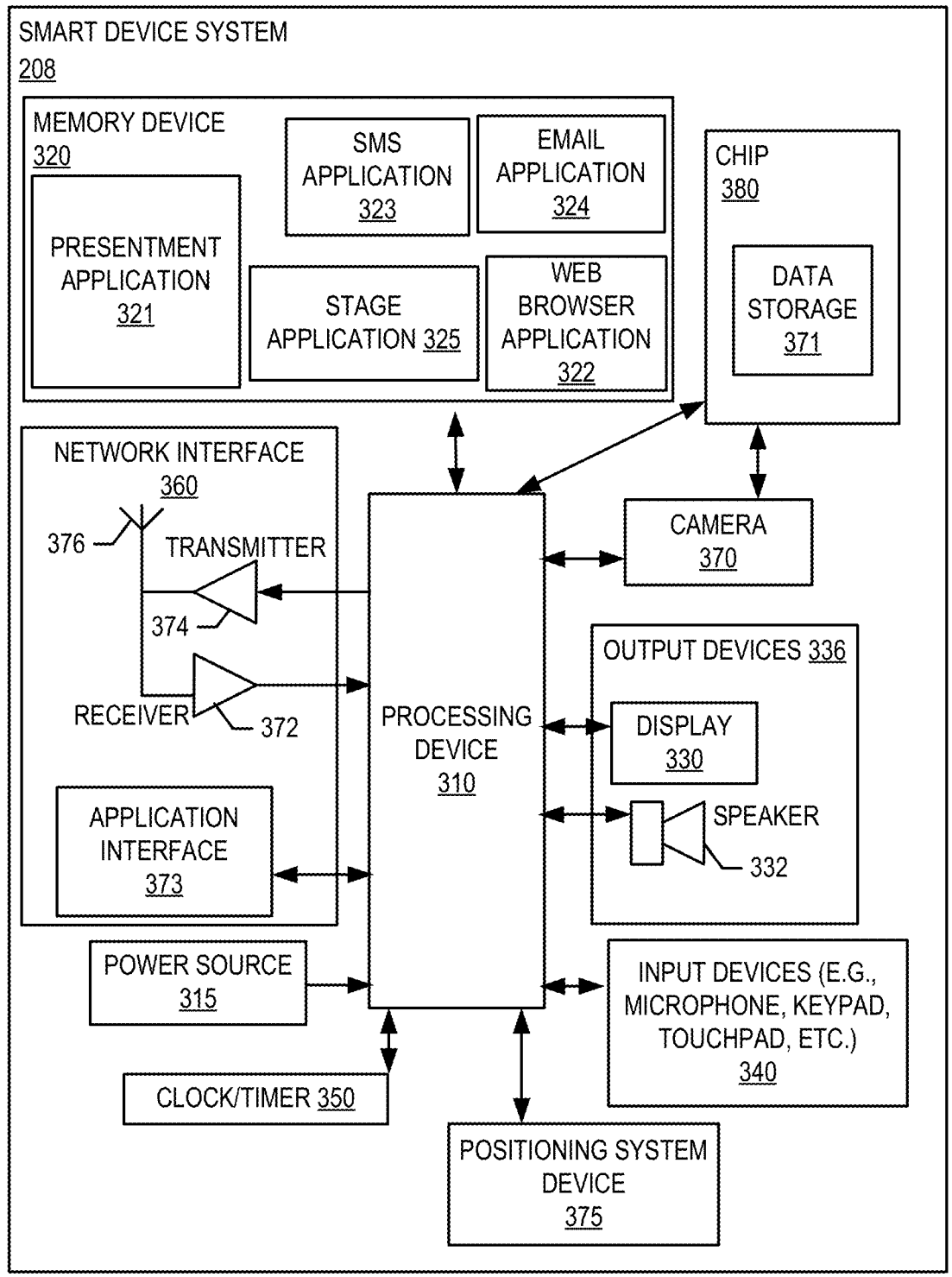
Figure 3:
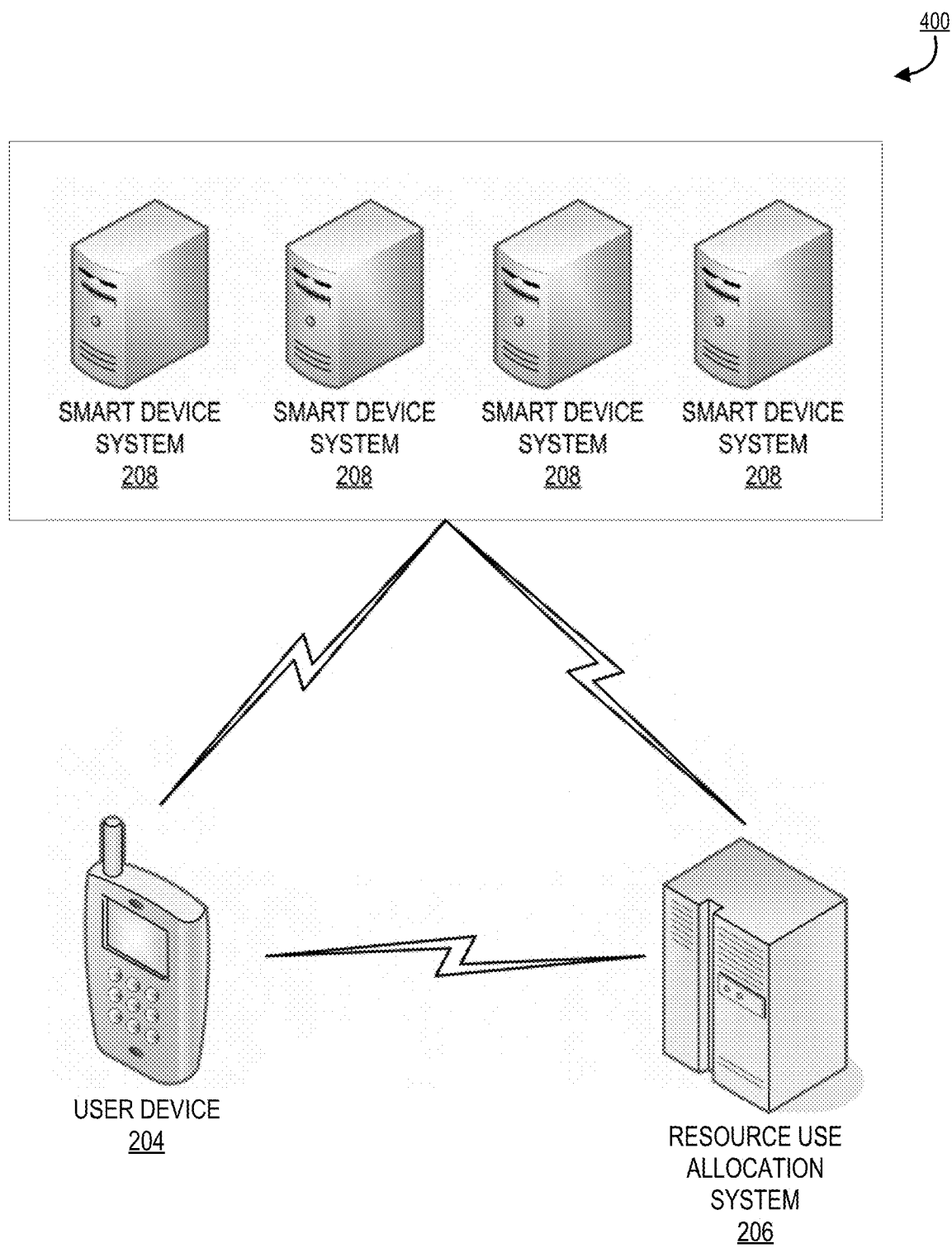
Figure 4:
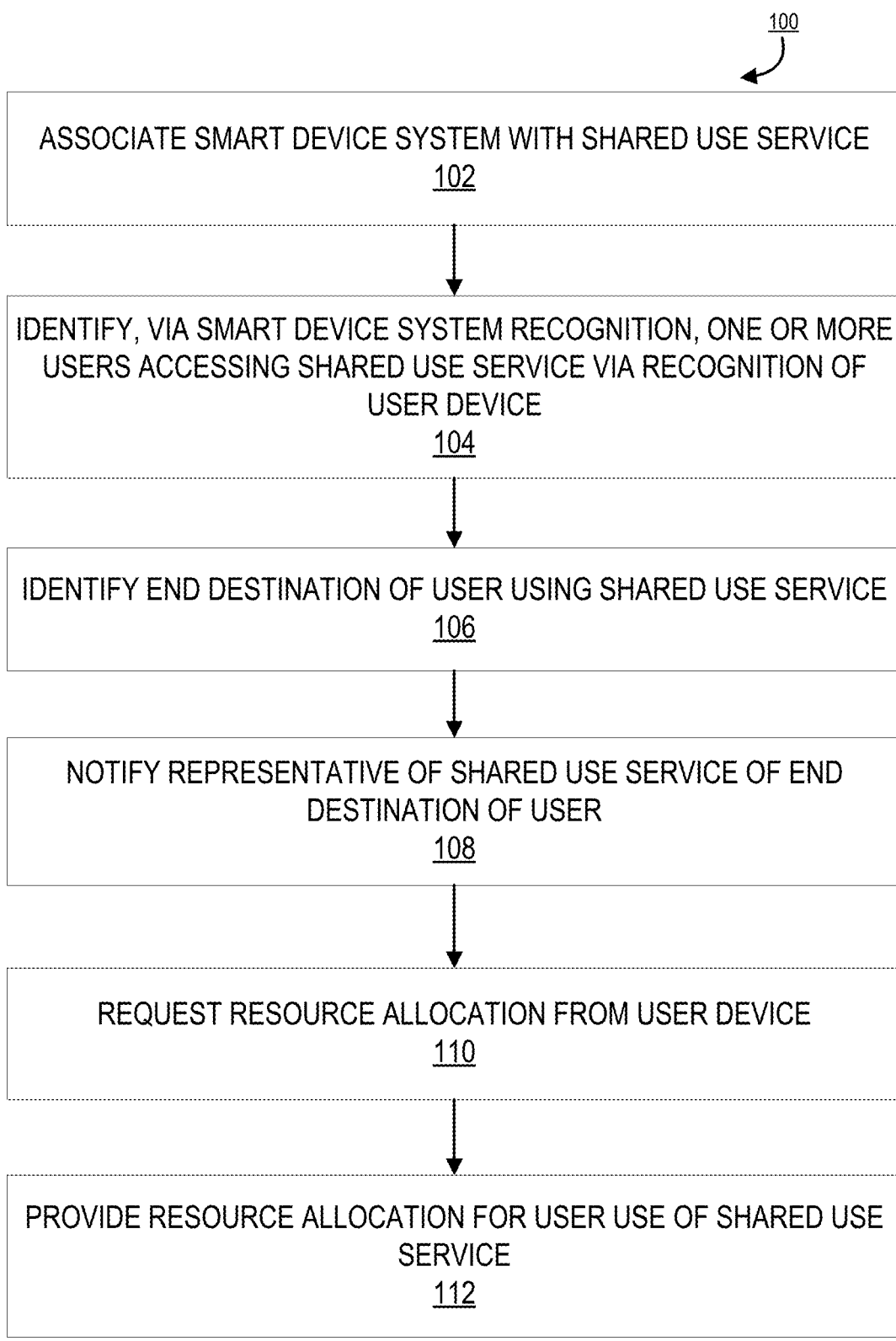
Figure 6:
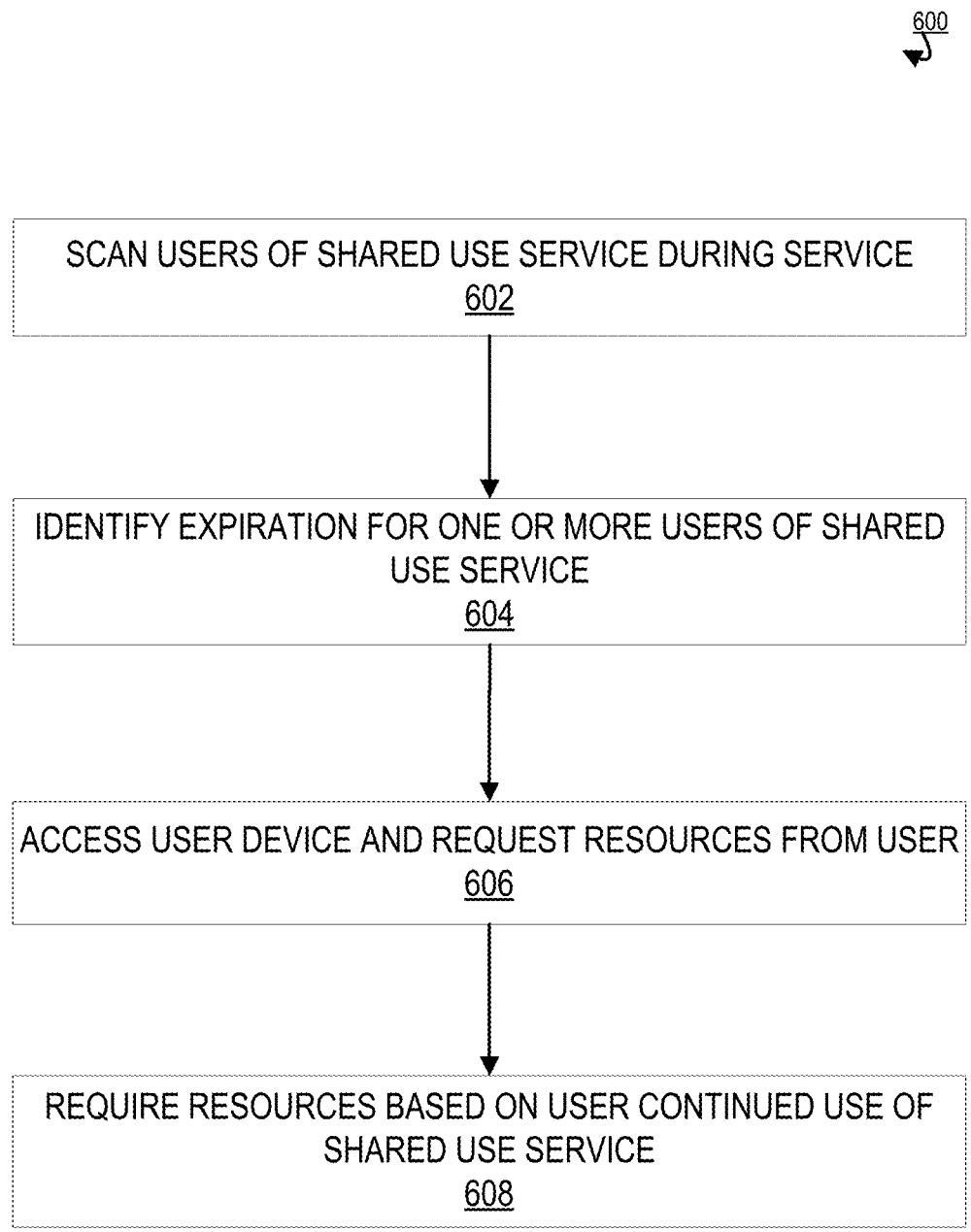

Having thus described embodiments of the invention in general terms, reference will now be made to the accompanying drawings, wherein:

FIG. 1 provides a resource use allocation and distribution system environment, in accordance with one embodiment of the present invention;

FIG. 2 provides a smart device system environment, in accordance with one embodiment of the present invention;

FIG. 3 provides a resource distribution system architecture environment, in accordance with one embodiment of the present invention;

FIG. 4 provides a high level process flow illustrating resource distribution for shared use services, in accordance with one embodiment of the present invention;

FIG. 5 provides a process map illustrating resource requirement identification for shared use services, in accordance with one embodiment of the present invention; and FIG. 6 provides a process map illustrating shared resource distribution accounts for multiple users of a shared use service, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any entity or individual that may use a shared use service and be associated with a user device or a smart system. For purposes of this invention, the term "user" and "user" may be used interchangeably. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "shared use service" may be any product or service that is shared between one or more users, this may include, but is not limited to, transportation such as public transportation, trains, planes, buses, taxies, shared products such as rental products, shared equipment, shared housing, shared services, or the like. A "transaction" or "resource distribution" refers to any communication between a user and the financial institution or other entity to transfer funds for the use of the shared use service.

In some embodiments, smart devices be associated with a network of physical objects such as buses, taxies, subways, other public transportation objects, products, buildings and other items embedded with network connectivity that allow for the objects to collect and exchange data. This exchange allows for objects to be sensed and monitored remotely for maintenance, fare collection, updates or the like. In this way, creating opportunities for more direct integration of the physical world into computer-based systems, and resulting in improved efficiency, accuracy and economic benefit. When products are augmented with sensors and actuators, the technology allows products to be interoperate within the existing internet infrastructure.

Embodiments of the present invention address the above needs and/or achieve other advantages by providing apparatuses (e.g., a system, computer program product and/or other devices) and methods for resource use allocation and distribution within a shared use service. The invention provides a resource use allocation and distribution system utilized by a shared use service. In this way, a shared use service, such as a service used by multiple users at one time, including public transportation or the like, may be associated with a smart device system. The smart device system may recognize when a user enters the shared use service location and a geographic location associated with the entering of the service location. The recognition may be performed via signal recognition of the user device transmission being received and/or communicated to the smart device system associated with the shared use service.

In some embodiments, once the smart device recognizes the user device, the smart device may reach out to the user device to identify an end destination of the user. The end destination may be determined by the system based on user input, based on data extracted from the user device such as historic information, or trends in previous uses of the shared use service. Once the end destination of the user is identified, the system may calculate the resources required by the shared use service for reaching that end destination. The resource requirement will be displayed to the user for acceptance of the resource usage. In this way, the system may eliminate expired tickets, transfer expenses, and misappropriation, by providing a resource allocation and distribution service for shared use services based on recognition of a user, via a user device, within a smart device field associated with the shared use service.

In some embodiments, the system may generate a cost sharing system. In this way, the smart device associated with the shared use service may communicate with user devices to distribute cost among several users of the shared use service. For example, a bus may identify the riders and interacts with their user devices to request resources for the bus fare. Alternatively, a metro bus/train service is able to track riders that have paid for the service and request resources from those that haven't. Furthermore, a shared account on multiple devices on cars or user devices may be utilized for a household to request resources from from resource accounts. The account can deny certain toll roads.

FIG. 1 illustrates a resource use allocation and distribution system environment 200, in accordance with one embodiment of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of resource allocation based shared use of a service.

As illustrated in FIG. 1, the smart device system 208 is operatively coupled, via a network 201 to the user device 204, and to the resource use allocation system 206. In this way, the smart device system 208 can send information to and receive information from the user device 204 and the resource use allocation system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that utilizes a shared use service. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the resource use allocation system 206 and the smart device system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the resource use allocation system 206.

As further illustrated in FIG. 1, the resource use allocation system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the smart device systems 208, the third party server 207, and the user device 204. As such, the communication device 246 generally comprises a modem, server, or other device for communicating with other devices on the network 201.

As further illustrated in FIG. 1, the resource use allocation system 206 comprises computer-readable instructions 254 stored in the memory device 250, which in one embodiment includes the computer-readable instructions 254 of an allocation application 258. In some embodiments, the memory device 250 includes data storage 252 for storing data related to the system environment 200, but not limited to data created and/or used by the allocation application 258.

In one embodiment of the resource use allocation system 206 the memory device 250 stores an allocation application 258. In one embodiment of the invention, the allocation application 258 may associate with applications having computer-executable program code that generate and code a tag for resource distribution from a user device 204 or smart device system 208. Furthermore, the resource use allocation system 206, using the processing device 248 codes certain communication functions described herein. In one embodiment, the computer-executable program code of an application associated with the allocation application 258 may also instruct the processing device 248 to perform certain logic, data processing, and data storing functions of the application.

The processing device 248 is configured to use the communication device 246 to communicate with and ascertain resources for the use of shared use services from the user 202.

In the embodiment illustrated in FIG. 1 and described throughout much of this specification, the allocation application 258 may be coded for the generation of a payment rail portal, communication with the smart device system 208, and communication linkage with the user device 204 for initiation and processing of a resource distribution for the shared use service.

As illustrated in FIG. 1, the smart device system 208 is connected to the user device 204 and resource use allocation system 206. The smart device system 208 is further detailed below with respect to FIG. 2. The smart device system 208 has the same or similar components as described above with respect to the user device 204 and the resource use allocation system 206. While only one smart device system 208 is illustrated in FIG. 1, it is understood that multiple smart device system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a smart device system environment. A "smart device" or "smart device system" as used herein means a device, apparatus and/or system that is capable of communicating with and transmitting information or data to and/or receiving information or data from other devices, systems or apparatuses including over network 201. In some embodiments, the smart device system 208 may be a stand-alone device that may be affixed to one or more products and/or machines to make the product and/or machine connective and to identify one or more user devices within the area located at or near the smart device system 208. The smart device system 208 may be for example, but not limited to, a machine such as an automobile, tractor trailer, bus, taxi, subway car, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device system 208 may be any device that includes a communication interface or module, software and/or hardware that allow the device to communicate data and/or information related to the device with other devices and/or systems over network 201.

The smart device system 208 may generally include a processing device 310 communicably coupled to devices as a memory device 320, output devices 336, input devices 340, a network interface 360, a power source 315, a clock or other timer 350, a camera 370, a positioning system device 375, one or more chips 380, and the like.

The processing device 310 is operatively coupled to the network communication interface 360 and the memory device 320. The smart device may also have a control system for controlling the physical operation of the device. The control system may comprise one or more sensors for detecting operating conditions of the various mechanical and electrical systems that comprise the smart device or of the environment in which the smart device is used. The sensors may communicate with the processing device 310 to provide identification of and recognition user devices located near the sensor and to provide feedback to the operating systems of the device. The control system may also comprise metering devices for measuring performance characteristics of the smart device. The control system may also comprise controllers such as programmable logic controllers (PLC), proportional integral derivative controllers (PID) or other machine controllers. The smart device may also comprise various electrical, mechanical, hydraulic or other systems that perform various functions of the smart device. These systems may comprise, for example, electrical circuits, motors, compressors, or any system that enables functioning of the smart device.

The processing device 310 may include functionality to operate one or more software programs or applications, which may be stored in the memory device 320. For example, the processing device 310 may be capable of operating a connectivity program, such as a web browser application 322. The web browser application 322 may allow for communication with the resource use allocation system 206 for providing data about a user device entering the shared use service location. In this way, the smart device system 208 may transmit and receive web content, such as, for example, product valuation, location-based content, and/or other web page content, according to a Wireless Application Protocol (WAP), Hypertext Transfer Protocol (HTTP), and/or the like.

The processing device 310 may also be capable of operating applications, such as a stage application 325 and/or a presentment application 321. The stage application 325 and/or presentment application 321 may be downloaded from a server and stored in the memory device 320 of the smart device systems 208. Alternatively, the stage application 325 and/or presentment application 321 may be pre-installed and stored in a memory in the chip 380.

In such an embodiment, the smart device system 208 may previously store the stage application 325 and/or presentment application 321 prior to affixing the smart device system 208 to the product. In this way the stage application 325 and/or presentment application 321 may remain and be stored on the smart device systems 208.

The stage application 325 provides the smart device system 208 with a determination module for the data that the smart device system 208 should communicate to the resource use allocation system 206.

The presentment application 321 provides the smart device system 208 with communication abilities to present the data to the resource use allocation system 206. The presentment application 321 may communicate with the other devices on the network 201 to provide real-time status of the smart device and user devices located at the shared use service.

In some embodiments, the smart device system 208 access one or more databases or datastores (not shown) to search for and/or retrieve information related to the device. In some embodiments, the smart device system 208 access both a memory and/or datastore local to the smart device system 208 as well as a datastore remote from the smart device systems 208.

The chip 380 may include the necessary circuitry to provide data gathering and presentation functionality to the smart device systems 208. Generally, the chip 380 will include data storage 371 which may include data associated with the products that the smart device systems 208. The tag chip 380 and/or data storage 371 may be an integrated circuit, a microprocessor, a system-on-a-chip, a microcontroller, or the like. In this way, the chip 308 will included data storage 371 which may include data associated with the presentment application 321.

Of note, while FIG. 2 illustrates the chip 380 as a separate and distinct element within the smart device systems 208, it will be apparent to those skilled in the art that the chip 380 functionality may be incorporated within other elements in the smart device systems 208. For instance, the functionality of the chip 380 may be incorporated within the memory device 320 and/or the processing device 310. In a particular embodiment, the functionality of the chip 380 is incorporated in an element within the smart device system 208 that provide use information, product activity, product depletion, and the like to the smart device systems 208. Still further, the chip 380 functionality may be included in a removable storage device such as an SD card or the like.

The processing device 310 may be configured to use the network interface 360 to communicate with one or more other devices on a network 201. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the smart device system 208 may be configured to operate with one or more air interface standards, communication protocols, modulation types, and access types. By way of illustration, the smart device system 208 may be configured to operate in accordance with any of a number of first, second, third, and/or fourth-generation communication protocols and/or the like. For example, the smart device system 208 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The smart device system 208 may also be configured to operate in accordance with non-cellular communication mechanisms, such as via a wireless local area network (WLAN) or other communication/data networks.

The network interface 360 may also include an application interface 373 in order to allow to execute some or all of the above-described processes with respect to the presentment application 321 and/or the chip 380. The application interface 373 may have access to the hardware, e.g., the transceiver, and software previously described with respect to the network interface 360. Furthermore, the application interface 373 may have the ability to connect to and communicate with an external data storage on a separate system within the network 201.

The smart device system 208 may have an interface that includes output devices 336 and/or input devices 340. The output devices 336 may include a display 330 (e.g., a liquid crystal display (LCD) or the like) and a speaker 332 or other audio device, which are operatively coupled to the processing device 310. The input devices 340, which may allow the smart device system 208 to receive data, may include any of a number of devices allowing the smart device system 208 to receive data, such as a keypad, keyboard, touch-screen, touchpad, microphone, mouse, joystick, other pointer device, button, soft key, and/or other input device(s).

The smart device system 208 may further include a power source 315. Generally, the power source 315 is a device that supplies electrical energy to an electrical load. In some embodiment, power source 315 may convert a form of energy such as solar energy, chemical energy, mechanical energy, or the like to electrical energy. Generally, the power source 315 in a smart device system 208 may be a battery, such as a lithium battery, a nickel-metal hydride battery, or the like, that is used for powering various circuits, e.g., the transceiver circuit, and other devices that are used to operate the mobile device 204. Alternatively, the power source 315 may be a power adapter that can connect a power supply from a power outlet to the smart device systems 208. In such embodiments, a power adapter may be classified as a power source "in" the smart device systems 208.

The smart device system 208 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

The memory device 320 may store any of a number of applications or programs which comprise computer-executable instructions/code executed by the processing device 310 to implement the functions of the smart device system 208 described herein. For example, the memory device 320 may include such applications as a presentment application 321, stage application 325, a web browser application 322, an SMS application 323, an email application 324, or the like.

In some embodiments, the smart device system 208 may identify the activity or use of the product associated with the smart device system 208. The smart device system 208 may do this via the positioning system device 375, camera 370, and the like. As such, the smart device system 208 may identify when the product is being used, how often it is being used, and the like.

FIG. 3 illustrates a resource distribution system architecture environment 400, in accordance with one embodiment of the present invention. As illustrated, one or more smart device system 208 may be associated with a machine or product associated with a shared use service. In some embodiments, this may include equipment, machinery, electronic devices, tools, furniture, buildings, clothing, materials, or the like equipped with technology capably of communicating across one or more devices via an interconnection. The smart devices 208 may be identified as affixed to or associated with the shared use service including the products or machines associated with the service. The system may use the smart device to identify user devices as they enter at or near the shared use service based on global positioning, signal recognition, code identification, or the like.

As discussed in further detail above with respect to FIG. 2, a smart device 208 generally includes, but is not limited to, a network communication interface, a processing device, and a memory device such as described herein. The processing device is operatively coupled to the network communication interface and the memory device. The smart device 208 may also have a control system for controlling the physical operation of the device. The control system may comprise one or more sensors for detecting user devices and operating conditions of the various mechanical and electrical systems that comprise the smart device 208 or of the environment in which the smart device is used. The sensors may communicate with the processing device to provide feedback to the operating systems of the device. The control system may also comprise metering devices for measuring performance characteristics of the smart device 208 for quality control and awareness. The control system may also comprise controllers such as programmable logic controllers (PLC), proportional integral derivative controllers (PID) or other machine controllers. The smart device 208 may also comprise various electrical, mechanical, hydraulic or other systems that perform various functions of the smart device 208. These systems may comprise, for example, electrical circuits, motors, compressors, or any system that enables functioning of the smart device. The smart device 208 may also include a resource distribution communication interface device that allows the smart device 208 to be connected to and to communicate with devices on the network and including the resource use allocation system 206 and the user device 204 for the transferring of resources for the shared use service employed. The communication interface device may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the smart device 208 may also include a communication interface device that may be connected by a hardwire connection to the resource distribution device. The interface device may comprise a connector such as a USB, SATA, PATA, SAS or other data connector for transmitting data to and from the smart device 208 to the resource use allocation system 206. In some embodiments the smart device 208 may comprise a port or plug that is compatible with a mating port or plug on resource use allocation system 206.

As such, the smart device system 208 may communicate information about the status of the device which may aid the resource use allocation system 206 in determining the user devices 204 that are in use or active on a shared use service. The resource use allocation system 206 may gather the information and data from the various one or more smart device system 208 in order to determine and provide a resource amount requirement for payment for the use of the shared use service by the user. The resource use allocation system 206, once amount is determined, may communicate the amount to the user device 204 for payment of the use of the shared use service.

FIG. 4 illustrates a high level process flow for resource distribution for shared use services 100, in accordance with one embodiment of the present invention. As illustrated in block 102, the process 100 is initiated by associating a smart device system with a shared use service. In this way, a smart device system may be affixed or otherwise associated with an object of a shared use service. The object may include a vehicle, subway, room, product, or the like that may be a shared by one or more users at various times.

Once the smart device is affixed or associated with the shared use service object, the shared use service object may now have a perimeter network established by the smart device association. As such, the system may identify, via smart device system recognition, one or more users accessing the shared use service, as illustrated in block 104. The identification may be done via a recognition of the user device entering the perimeter network of the object associated with the shared use service, such as a bus, taxi, home, apartment, product, subway, or the like. As such, the smart device may recognize a signal being distributed by the user device as it enters the perimeter associated with the shared use service.

Once communication is established between the smart device associated with the shared use service and the user device, the system may identify the end destination of the user using the shared use service, as illustrated in block 106. The end destination of the user may be, for example, a stop on a bus or subway line, a taxi stop, a duration of time staying at an apartment, duration of renting the equipment, or the like. As such, the system may identify an end destination for the user using the shared use service. The identification may be based on user input on an interactive display, recognition of historic shared use service, or transaction history of the user.

Next, as illustrated in block 108, the process 100 continues by notifying a representative of the shared use service of the end destination of the user. As such, if a representative is present in the shared use service, such as a bus driver, taxi driver, landlord, or the like, the system may present the representative with information about the end destination of the user. As such, for example, if a user desires to stop at a specific bus stop, the system may notify the representative bus driver of the stop, such that the representative may stop at the bus stop that the user desires.

As illustrated in block 110, the process 100 continues by requesting resource allocation from the user device. As such, the system identifies the end destination of the user and calculates the resources required to reach that end destination. The resource requirement is then distributed from the system to the user device for review by the user and request for the resource amount.

As illustrated in block 112, the process 100 is completed by allowing the user to provide the resource allocation for the user use of the shared use service via an account that manages resources, via selection and authentication at the user device.

FIG. 5 illustrates a process map for resource requirement identification for shared use services 500, in accordance with one embodiment of the present invention. The process 500, is initiated by identifying the user device within the smart device parameter of the shared use service, as illustrated in block 502. The identification may be made based on an identification of a user device signal being recognized in an object of the shared use service. The object may be an apartment, house, bus, taxi, train, or the like. As such the smart device affixed or associated with the object of the shared use service may produce a signal that will recognize one or more user devices as the devices approach the object associated with the shared use service. In some embodiments, the smart device recognizes the user device in the parameter of the shared use service. In other embodiments, the user device sends a communication signal to the smart device upon entering the parameter of the shared use service. In some embodiments, the parameter of the shared use service may be a parameter of the object associated with the shared use service, such as the parameter of a subway station, subway car, bus terminal, or the like.

In some embodiments, as illustrated in block 503, the system may identify that the user device is associated with the user of the account for resource distribution for use of the shared use service. In other embodiments, as illustrated in block 505, the system may identify that the user device is associated with someone other than the user, but that individual is identified as a shared account holder with the user. In this way, a user may provide family members or friends access to the user's account and resources for providing payment to the shared use service.

Next, as illustrated in block 504, the process 500 continues by communicating with the user device to determine the end destination of the user. In this way, once the user device is identified within the shared use service location, the system may establish a communication linkage between the user device and the system. Once communication is established between the smart device associated with the shared use service and the user device, the system may identify the end destination of the user using the shared use service. The end destination of the user may be, for example, a stop on a bus or subway line, a taxi stop, a duration of time staying at an apartment, duration of renting the equipment, or the like. As such, the system may identify an end destination for the user using the shared use service.

In some embodiments, the end destination of the user may be provided by the user via user input 506. In some embodiments, the end destination of the user may be determined by historic trends 508. In some embodiments, the end destination of the user may be determined by data retrieval 510. In some embodiments, a combination of one or more user inputs 506, historic trends 508, and/or data retrieval 510 may be used to determine the end destination of the user. The end destination may be an end stop on a bus or subway line, a lease termination date, or the like. Based on the user history, the system may require the user to provide resources for the use of the shared use service prior to accessing the user. In this way, a pre-resource input is required from the user. In some embodiments, the system may provide a specific type or grade of object based on the type of user.

In some embodiments, the end destination of the user may be provided by the user via user input 506. In this way, the system may push, via the communication linkage between the smart device and the user device, an interface to the user device for user interaction and selection of an end destination. As such, the user may input a location, time, or the like that designates the user's end destination.

In some embodiments, the end destination of the user may be determined by the system based on historic trends of the user 508. In this way, the system may recognize the user system and associate it with past use of the shared use service. As such, the system may maintain a record of the user device history including historic end destinations for the user. For example, if a user rides the same subway at the same time every day, the system may predict the end destination for the user at that time in the future. As such, the system identifies the user device via a unique identifier of the device and stores the time, date, and end destination for future referencing. That way, upon identification of the user accessing the shared use service again, the system may identify a trend in use and predict the end destination of the user.

In some embodiments, the end destination of the user may be determined by data retrieval 510. In this way, the system may retrieve data from the user device, such as data about upcoming trips, reservations, calendared plans, or the like that may provide the system an indication of the user's end destination.

Next, as illustrated in block 512, the process 500 continues by identifying potential transfers from one shared use service to another in order for the user to reach his/her end destination. In this way, based on the end destination, the system may determine if the user is able to use the shared use service for the entire duration or if a switch in shared use service is required. For example, a user may have to switch subway lines in order to reach his/her destination. The system may incorporate any potential transfers from the shared use service object or vehicle to a second shared use service object or vehicle.

Once the potential transfers are identified, the system may determine a resource amount required from the user to reach the end destination. In some embodiments, the resource amount may be a monthly payment amount. In other embodiments, the resource amount may be a onetime payment amount. As illustrated in block 514, the process 500 continues by communicating the determined required resource amount for the use of the shared use service to the user device. In this way, the system may automatically generate the resource requirement and present it to the user via a display on the user device. The displayed screen may lock the user device functionality until the resource requirement has been satisfied for the use of the shared use service. This locking may occur only if the user is currently using the shared use service and resources are required for the user to continue to use the shared use service.

Next, as illustrated in block 516, the process 500 continues by receiving resources from the user for using the shared use service. In some embodiments, the resources may be from an account associated with the user. In other embodiments, the resources may be from a shared account that is shared between the user and multiple other individuals. These shared accounts may be shared between employees, family members, or the like in order to share or distribute the resources requires for the shared use service.

Finally, as illustrated in block 518, the process 500 is completed notifying the shared use service representative of the user end destination, such that the representative may take appropriate measures to reach the end destination. For example, if the end destination is a bus terminal or stop, the system may notify the representative driving the bus of a user desiring to stop at the terminal or stop.

FIG. 6 illustrates a process map for shared resource distribution accounts for multiple users of a shared use service 600, in accordance with one embodiment of the present invention. As illustrated in block 602, the process 600 initiates by scanning the user devices of users that are on currently using the shared use service while the service is occurring. As such, while the service is being performed, the system will scan the user devices using the service to determine if each user has provided resources to the service as payment for the service. For example, once a bus door closes and the bus begins its route, the system may scan each user device on the bus to ensure that each user associated with the device has provided resources for the bus ride.

Next, as illustrated in block 604, the process 600 continues by identifying any expiration or non-payment users of the shared use service. In this way, there may be one or more users that have expired passes for using the shared use service, missed fare, or the like for a shared use service. The system may identify the one or more users that have not provided resources for use of the shared use service.

Next, as illustrated in block 606, the process 600 continues by accessing user devices and requesting resources from the user. As such, the system may provide the user with an interface indicating the amount of resources owed by the user for the prior use of the shared use service. Finally, as illustrated in block 608, the process 600 is completed by requiring resources based on the user continued use of the shared use service. If resource requirements are not met, the representative may be notified and the representative may discuss the resource requirements with the user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource use allocation for a shared use service, the system comprising:
   a memory device with computer-readable program code stored thereon;
   a communication device;
   a processing device operatively coupled to the memory device and the communication device, wherein the processing device is configured to execute the computer-readable program code to:
   link a smart device systems to an object of a shared use service, wherein the object is a product;
   generate a communication area within the object of the shared use service;
   identify one or more user devices within the communication area;
   receive historic data from a user device, wherein the historic data comprises a unique device identifier, and wherein the historic data comprises time, date, and end destinations where the user device has traveled;
   identify, using the historic data, a pattern of end destinations for a user of the user device;
   based on the identified pattern of end destinations for the user, determine an end destination of the user associated with user device;
   identify one or more transfers to a second object of the shared use service for the user to reach the end destination;
   communicate, via a secure communication linkage established in the communication area, an interface with a resource requirement for the end destination, wherein communicating the interface with the resource requirement comprises displaying the resource requirement to the user;
   lock the screen of the user device until the resource requirement is accepted by the user for the end destination and triggering of representative action;
   receive resource requirement from the user from a shared account, wherein the shared account provides a distribution of resources required for the shared use services;
   trigger representative action upon identification of the user end destination; and
   transmit, to a representative operating the object, the user end destination for the shared use service for termination of the service at the end destination.

2. The system of claim 1, further comprising scanning for user devices on the object while the shared use service is being performed to determine non-compliant users using the shared use service, wherein upon determination of non-compliance, request resources from the user device.

3. The system of claim 1, wherein generating a communication area within the object of the shared use service further comprises generating a communication recognition area within and within a predetermined distance around the object, wherein the communication area recognizes a presence of one or more signal transmitting devices within the communication area.

4. The system of claim 1, wherein determining the end destination of user associated with user device within the communication area further comprises pushing via a communication linkage with the communication area, an interface to the user at the user device for user selection of an end destination.

5. The system of claim 1, wherein determining the end destination of user associated with user device within the communication area further comprises reviewing historic user use of the shared use service for trends and predicting the end destination of the user based on the trends.

6. The system of claim 1, wherein identifying the one or more user devices that are associated with the user within the communication area further comprises identifying a geographic location of the object using GPS associated with the smart device system and identifying transmitting signals associated with the one or more user devices from within the geographic location.

7. The system of claim 1, wherein the object with the smart device system associated therewith further comprise a products, machinery, or vehicle using the smart device systems for transmitting signals associated with the product or machinery capable of identifying user devices within the signal transmission.

8. A computer program product for resource use allocation for a shared use service, the computer program product comprising at least one non-transitory computer-readable medium having computer-readable program code portions embodied therein, the computer-readable program code portions comprising:
an executable portion configured for linking a smart device systems to an object of a shared use service, wherein the object is a product;
an executable portion configured for generating a communication area within the object of the shared use service;
an executable portion configured for identifying one or more user devices within the communication area;
an executable portion configured for receiving historic data from a user device, wherein the historic data comprises a unique device identifier, and wherein the historic data comprises time, date, and end destinations where the user device has traveled;
an executable portion configured for identifying, using the historic data, a pattern of end destinations for a user of the user device;
an executable portion configured for determining end destination of the user associated with user device based on the identified pattern of end destinations for the user;
an executable portion configured for identifying one or more transfers to a second object of the shared use service for the user to reach the end destination;
an executable portion configured for communicating, via a secure communication linkage established in the communication area, an interface with a resource requirement for the end destination, wherein communicating the interface with the resource requirement comprises displaying the resource requirement to the user;
an executable portion configured for locking the screen of the user device until the resource requirement is accepted by the user for the end destination and triggering of representative action;
an executable portion configured for receiving resource requirement from the user from a shared account, wherein the shared account provides a distribution of resources required for the shared use services;
an executable portion configured for triggering representative action upon identification of the user end destination; and
an executable portion configured for transmitting, to a representative operating the object, the user end destination for the shared use service for termination of the service at the end destination.

9. The computer program product of claim 8, further comprising an executable portion configured for scanning for user devices on the object while the shared use service is being performed to determine non-compliant users using the shared use service, wherein upon determination of non-compliance, request resources from the user device.

10. The computer program product of claim 8, wherein generating a communication area within the object of the shared use service further comprises generating a communication recognition area within and within a predetermined distance around the object, wherein the communication area recognizes a presence of one or more signal transmitting devices within the communication area.

11. The computer program product of claim 8, wherein determining the end destination of user associated with user device within the communication area further comprises pushing via a communication linkage with the communication area, an interface to the user at the user device for user selection of an end destination.

12. The computer program product of claim 8, wherein determining the end destination of user associated with user device within the communication area further comprises reviewing historic user use of the shared use service for trends and predicting the end destination of the user based on the trends.

13. The computer program product of claim 8, wherein identifying the one or more user devices that are associated with the user within the communication area further comprises identifying a geographic location of the object using GPS associated with the smart device system and identifying transmitting signals associated with the one or more user devices from within the geographic location.

14. The computer program product of claim 8, wherein the object with the smart device system associated therewith further comprise a products, machinery, or vehicle using the smart device systems for transmitting signals associated with the product or machinery capable of identifying user devices within the signal transmission.

15. A computer-implemented method for resource use allocation for a shared use service, the method comprising:
providing a computing system comprising a computer processing device and a non-transitory computer readable medium, where the computer readable medium comprises configured computer program instruction code, wherein said instruction code is operated by said computer processing device, and wherein said computer processing device performs the following operations:
linking a smart device systems to an object of a shared use service, wherein the object is a product;
generating a communication area within the object of the shared use service;

identifying one or more user devices within the communication area;
receiving historic data from a user device, wherein the historic data comprises a unique device identifier, and wherein the historic data comprises time, date, and end destinations where the user device has traveled;
identifying, using the historic data, a pattern of end destinations for a user of the user device;
based on the identified pattern of end destinations for the user, determining end destination of user associated with user device within the communication area;
identifying one or more transfers to a second object of the shared use service for the user to reach the end destination;
communicating, via a secure communication linkage established in the communication area, an interface with a resource requirement for the end destination, wherein communicating the interface with the resource requirement comprises displaying the resource requirement to the user;
locking the screen of the user device until the resource requirement is accepted by the user for the end destination and triggering of representative action;
receiving resource requirement from the user from a shared account, wherein the shared account provides a distribution of resources required for the shared use services;
triggering representative action upon identification of the user end destination; and
transmitting, to a representative operating the object, the user end destination for the shared use service for termination of the service at the end destination.

16. The computer-implemented method of claim 15, further comprising scanning for user devices on the object while the shared use service is being performed to determine non-compliant users using the shared use service, wherein upon determination of non-compliance, request resources from the user device.

17. The computer-implemented method of claim 15, wherein generating a communication area within the object of the shared use service further comprises generating a communication recognition area within and within a predetermined distance around the object, wherein the communication area recognizes a presence of one or more signal transmitting devices within the communication area.

18. The computer-implemented method of claim 15, wherein determining the end destination of user associated with user device within the communication area further comprises pushing via a communication linkage with the communication area, an interface to the user at the user device for user selection of an end destination.

19. The computer-implemented method of claim 15, wherein determining the end destination of user associated with user device within the communication area further comprises reviewing historic user use of the shared use service for trends and predicting the end destination of the user based on the trends.

20. The computer-implemented method of claim 15, wherein the object with the smart device system associated therewith further comprise a products, machinery, or vehicle using the smart device systems for transmitting signals associated with the product or machinery capable of identifying user devices within the signal transmission.

* * * * *